(12) United States Patent
Sakai

(10) Patent No.: US 8,061,227 B2
(45) Date of Patent: Nov. 22, 2011

(54) SMALL SLIDER UNIT

(75) Inventor: Tetsuya Sakai, Tokyo (JP)

(73) Assignee: Nippon Thompson Co., Ltd., Tokyo (JP)

( * ) Notice: Subject to any disclaimer, the term of this patent is extended or adjusted under 35 U.S.C. 154(b) by 430 days.

(21) Appl. No.: 12/241,425

(22) Filed: Sep. 30, 2008

(65) Prior Publication Data

US 2009/0092344 A1    Apr. 9, 2009

(30) Foreign Application Priority Data

Oct. 4, 2007  (JP) .................................. 2007-261212

(51) Int. Cl.
F16H 27/02 (2006.01)
F16H 29/02 (2006.01)
F16H 29/20 (2006.01)

(52) U.S. Cl. ...................................... 74/89.34; 74/89.32

(58) Field of Classification Search .................. 74/89.23, 74/89.32, 89.33, 424.71, 424.81, 424.82, 74/89.34; 403/306

See application file for complete search history.

(56) References Cited

U.S. PATENT DOCUMENTS

| | | | | |
|---|---|---|---|---|
| 2,340,029 A * | 1/1944 | Weingartner | .................... | 82/137 |
| 2,520,014 A * | 8/1950 | Rehnberg et al. | ................ | 318/39 |
| 2,882,735 A * | 4/1959 | Bergmann | .......................... | 74/58 |
| 2,883,182 A * | 4/1959 | Bornemann | ................. | 74/89.23 |
| 2,885,502 A * | 5/1959 | Eichelberger et al. | ..... | 200/50.25 |
| 2,929,439 A * | 3/1960 | Akira et al. | .................... | 248/393 |
| 3,336,925 A * | 8/1967 | Thompson, III | ............... | 604/155 |
| 3,527,110 A * | 9/1970 | Rogers et al. | ................. | 74/89.23 |
| 3,698,673 A * | 10/1972 | Olsen | ............................. | 248/421 |
| 3,777,587 A * | 12/1973 | Hoshina et al. | .............. | 74/89.23 |
| 4,929,165 A * | 5/1990 | Inaba et al. | ..................... | 425/150 |
| 5,033,566 A * | 7/1991 | Moretti et al. | ................ | 180/445 |
| 5,327,062 A * | 7/1994 | Byers | ............................ | 318/687 |
| 5,444,880 A * | 8/1995 | Weismiller et al. | ............... | 5/424 |
| 6,142,426 A * | 11/2000 | Zaro et al. | ...................... | 246/125 |
| 6,240,796 B1 * | 6/2001 | Yamada | ....................... | 74/89.23 |
| 6,848,327 B2 * | 2/2005 | Nagai et al. | .................. | 74/89.33 |
| 6,880,417 B2 * | 4/2005 | Nagai et al. | .................. | 74/89.36 |
| 7,329,199 B2 * | 2/2008 | Blendea et al. | ..................... | 475/4 |
| 7,383,800 B2 * | 6/2008 | Kawakami et al. | ........ | 123/90.16 |
| 7,444,894 B2 * | 11/2008 | Harper et al. | ................. | 74/89.23 |
| 7,488,110 B2 * | 2/2009 | Lee et al. | ......................... | 384/45 |

(Continued)

FOREIGN PATENT DOCUMENTS

JP          3927286          6/2007

Primary Examiner — Justin Krause
Assistant Examiner — Adam D Rogers
(74) Attorney, Agent, or Firm — Cozen O'Connor

(57) ABSTRACT

A small slider unit having a size effectively reduced in the longitudinal direction is equipped with a rail 22; a slide table 23 moving on the rail 22; a screw shaft 26 coupled to the slide table 23 and situated parallel to the rail 22; a motor M for rotating the screw shaft 26; a coupling member 31 for providing the coupling between a rotating shaft 32 of the motor M and the screw shaft 26; and a bearing 29 supporting the screw shaft 26. The screw shaft 26 is rotated by driving the motor M, whereupon the rotation of the screw shaft 26 moves the slide table 23 in the axis direction of the rail 22. The screw shaft 26 has a holding portion 27a, and the bearing 29 is held between the holding portion 27a and the coupling member 31.

1 Claim, 4 Drawing Sheets

U.S. PATENT DOCUMENTS

| | | | |
|---|---|---|---|
| 7,562,594 B2* | 7/2009 | Nagai et al. | 74/89.23 |
| 7,856,900 B2* | 12/2010 | Benoit et al. | 74/89.34 |
| 2007/0290556 A1* | 12/2007 | Hochhalter et al. | 310/12 |
| 2008/0168852 A1* | 7/2008 | Chen et al. | 74/89.23 |
| 2008/0210028 A1* | 9/2008 | Sato | 74/89.23 |
| 2009/0095098 A1* | 4/2009 | Fisher et al. | 74/89.23 |
| 2009/0165581 A1* | 7/2009 | Koyagi et al. | 74/89.23 |

* cited by examiner

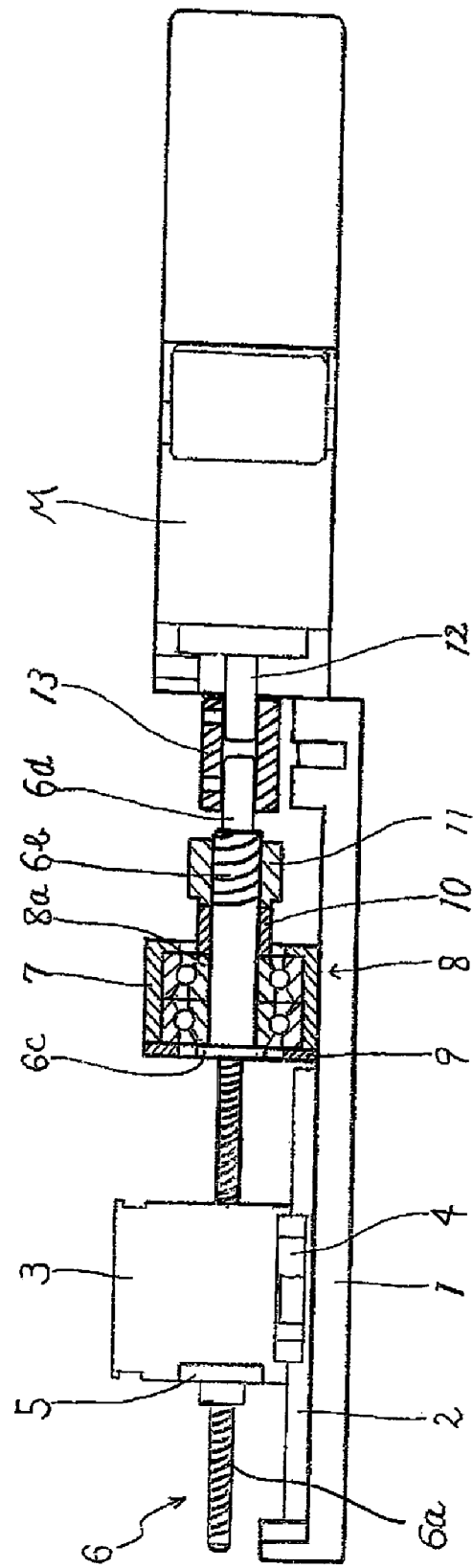
Fig. 3  *Prior Art*

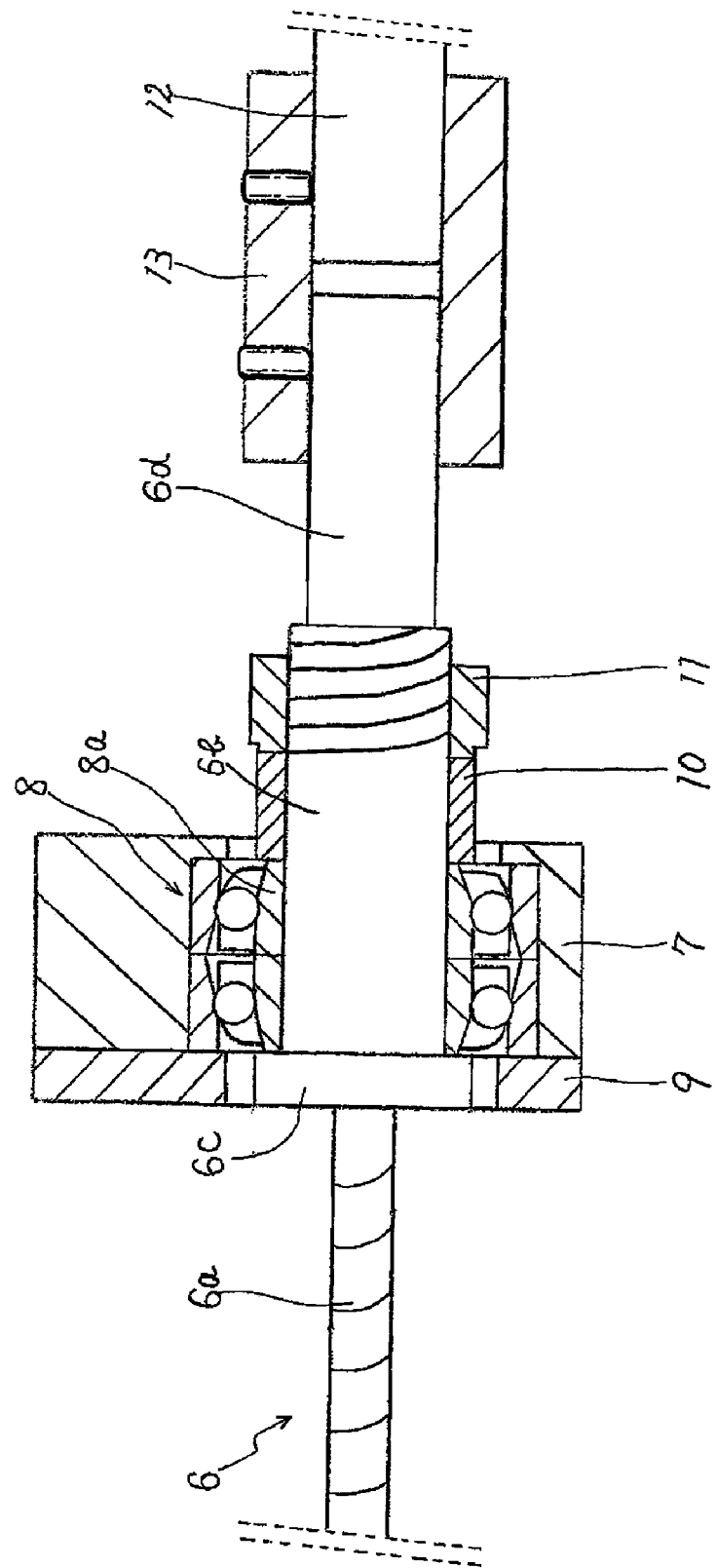
Fig. 4 *Prior Art*

SMALL SLIDER UNIT

BACKGROUND OF THE INVENTION

1. Field of the Invention

This invention relates to a small slider unit having a slide table linearly moving by use of a rotational force generated by a screw shaft rotated by a motor.

2. Description of the Related Art

An example of conventional slider units is described with reference to FIG. 3 and FIG. 4.

As shown in FIG. 3, a rail 2 is mounted on a mounting base 1 and a slide table 3 moves along the rail 2. Specifically, C-shaped cross-section guide members 4 are provided on the two sides of the slide table 3 and slidably straddle the rail 2 to allow for the movement of the slide table 3 along the rail 2.

The slide table 3 has a hole extending therethrough in the axis direction of the rail 2. A ball nut 5 is screwed in the hole, and then is engaged with a threaded portion 6a of a screw shaft 6. When the screw shaft 6 is rotated, the rotational force moves a combination of the ball nut 5 and the slide table 3 along the rail 2.

The screw shaft includes the threaded portion 6a having a screw groove formed, and a supporting portion 6c made up of a round bar having a diameter lager than that of the threaded portion 6a, and additionally a flange 6c is interposed between the threaded portion 6a and the supporting portion 6b.

A casing 7 having a hole through which the supporting portion 6b is secured on the mounting base 1. An angular bearing 8 is built in the casing 7. A lid member 9 is secured to an opening of the casing 7 to prevent the angular bearing 7 from falling out of the casing 7.

The angular bearing 8 has an inner ring 8a through which the supporting portion 6b of the screw shaft 6 passes. The inner ring 8a has an end adjoining the flange 6c and the other end adjoining a collar 10. The inner ring 8a of the angular bearing 8 is pressed between the collar 10 and the flange 6c by a bearing nut 11 fixedly screwing into the screw groove formed on the supporting portion 6b. In this manner, the inner ring 8a is fixedly interposed between the flange 6c and the collar 10 to inhibit the screw shaft 6 from rattling in the axis direction.

One of the opposing ends of the supporting portion 6b is coupled to the threaded portion 6a, and at the other end an interlock portion 6d of a smaller diameter than that of the supporting portion 6b is provided. The leading end of the interlock portion 6d faces a rotating shaft 12 of a motor M. The interlock portion 6d of the screw shaft 6 is connected through a coupling member 13 to the rotating shaft 12. As a result, the motor M is driven so as to rotate the rotating shaft 12, whereupon the screw shaft 6 rotates concurrently with the rotating shaft 12. Then, the rotation of the screw shaft 6 moves the slide table 3 along the rail 2.

Upon the movement of the slide table 3, a reaction acts on the screw shaft 6, so that the screw shaft 6 attempts to move in the direction opposite to the direction of movement of the slide table 3. Similarly, when any external force acts on the screw shaft 6, the screw shaft 6 may possibly move in the axis direction. If the screw shaft 6 is caused to move in the axis direction as described above, the slide tale 3 will be moved to an incorrect position.

For example, the above-described slider unit is employed as a positioning apparatus for use in the manufacturing process for semiconductor devices, the slide tale 3 on which a semiconductor is mounted is moved to various positions in which the semiconductor undergoes predetermined treatments. For this purpose, high precision is required to stop the movement of the slide table 3 in a correct position. In particular, for producing small workpieces such as semiconductors, a very high degree of precision in microns is required. Accordingly, in a small slider unit, the screw shaft 6 is inhibited from moving in the axis direction by use of the bearing nut 11 to secure the flange 6c and the collar 10 to prevent play from being created in an area between the flange 6c and the collar 10.

Such a slider unit as described above is disclosed in Japanese Patent No. 3927285, for example.

As described above, for conveying a small workpiece such as a semiconductor, the slider unit itself is required to be reduced in size. For example, the slide table 3 of the slider unit used in the manufacturing process of the semiconductor devices moves a short distance ranging from about 20 mm to about 50 mm, so that a short screw shaft 6 is sufficient for use. Also, the load-carrying capacity is not much required. Because of this, the slide tale 3 and the mounting base 1 can be reduced in size. In some slider units, the width of the slid table 3 and the mounting base 1 is reduced to about 10 mm to about 20 mm.

However, conventional slider units must have space for placing the collar 10 and the bearing nut 11 for the purpose of inhibiting the movement of the screw shaft 6 in the axis direction. In addition, another space is required for the coupling member 13 which provides connection between the rotating shaft 12 and the screw shaft 6 (interlock portion 6d). In this manner, the collar 10 and the bearing nut 11 or the coupling member 13 must be arranged in the axis direction of the screw shaft 6. As the next logical step, the length of the screw shaft 6 is increased, resulting in an increase in the length of the entire unit.

That is, in conventional slider units, even though the movement range of the slide tale 3 is very short, it is disadvantageously necessary to restrain a reduction in size of the slider unit in the longitudinal direction.

SUMMARY OF THE INVENTION

It is an object of the present invention to provide a slider unit having a size effectively reduced in the longitudinal direction.

The present invention relates to a small slider unit comprising: a rail; a slide table moving on the rail; a screw shaft coupled to the slide table and situated parallel to the rail; a motor for rotating the screw shaft; a coupling member for providing the coupling between a rotating shaft of the motor and the screw shaft; and a bearing supporting the screw shaft. The screw shaft is rotated by driving the motor, whereupon the rotation of the screw shaft moves the slide table in the axis direction of the rail.

The small slider unit of the present invention is characterized in that the screw shaft has a holding portion, and the bearing is held between the holding portion and the coupling member.

According to the present invention, since the bearing is held between the coupling member and the holding portion provided on the screw shaft, the need for parts provided specifically for inhibiting the movement of the screw shaft in the axis direction, such as a collar or a bearing nut, and also the need for a screw groove for the bearing nut are eliminated. As a result, the space occupied by such unnecessary parts in the axis direction of the screw shaft can be omit, thus advantageously downsizing the entire unit.

In addition, because such specific parts are made unnecessary, it is possible to reduce the component count to achieve cost reduction.

In the present invention, the small slider unit preferably includes a cap member having a flange and fixed to a leading end of the screw shaft, and the flange forms the holding portion.

According to the present invention, when the cap member with the flange is employed, the costs involved in the manufacturing process can be reduced as compared with the case when the holding portion is formed in the screw shaft. Also, because the cap member constitutes the holding portion, this makes it unnecessary to machine the leading end of the screw shaft. For this reason, the screw shaft can be cut for use in accordance with the size of the slider unit, resulting in a reduction in inventories because of the common use of the screw shaft.

BRIEF DESCRIPTION OF THE DRAWINGS

FIG. 3 is a schematic diagram of a conventional slider unit.
FIG. 4 is a partial enlarged view of the conventional slider unit.

BEST MODE FOR CARRYING OUT THE INVENTION

A slider unit of an embodiment according to the present invention will be described below with reference to FIG. 1 and FIG. 2.

Figure 1:
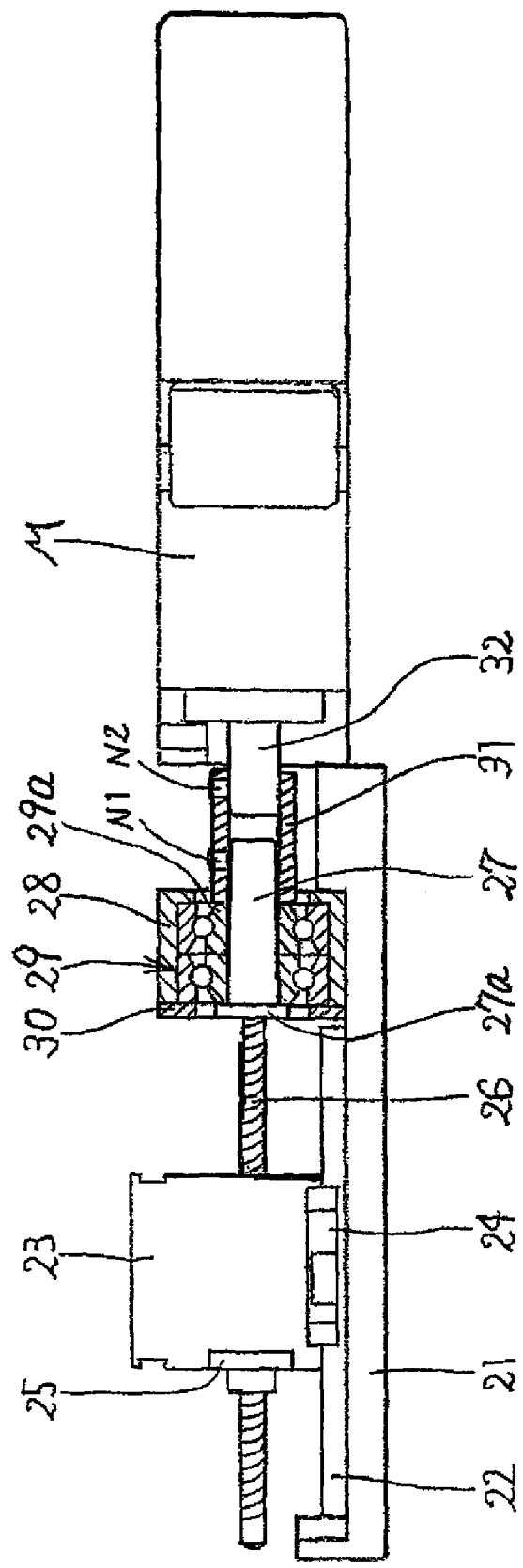
FIG. 1 is a schematic diagram of a slider unit according to an embodiment of the present invention.

As illustrated in FIG. 1, a rail 22 is mounted on a mounting base 21 and a slide table 23 moves along the rail 22. Specifically, C-shaped cross-section guide members 24 are provided on the two sides of the slide table 23 and slidably straddle the rail 22 to allow for the movement of the slide table 23 along the rail 22.

The slide table 23 has a hole extending therethrough in the axis direction of the rail 22. A ball nut 25 is screwed in the hole, such that a screw groove of a screw shaft 26 is engaged with the ball nut 25. When the screw shaft 26 is rotated, the rotational force moves a combination of the ball nut 25 and the slide table 23 along the rail 22.

Figure 2:
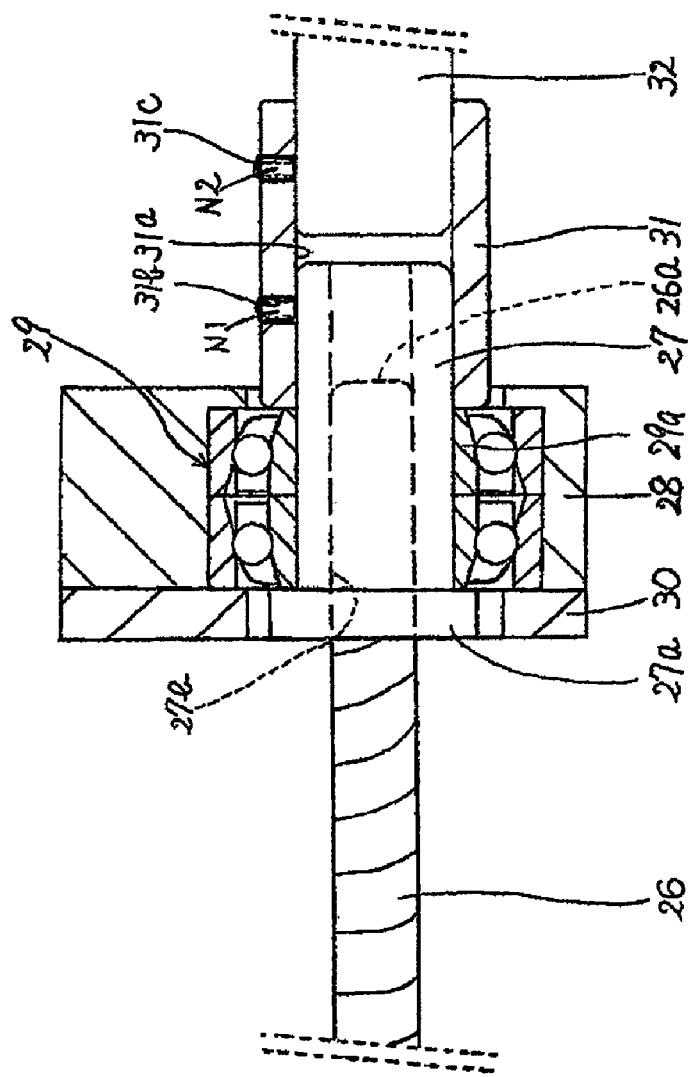
FIG. 2 is a partial enlarged view of the slider unit according to the embodiment.

As illustrated in FIG. 2, the leading end 26a of the screw shaft 26 closest to the motor is fixedly press-fitted into a cap member 27. The cap member 27 has a flange 27a provided at one end in the longitudinal direction, and a through hole 27b extending therethrough from the other end to the end at which the flange 27a is provided. The inner diameter of the through hole 27b is approximately equal to the diameter of the screw shaft 26 such that the dimensional relationship that the cap member 27 is press-fitted over and fixed to the screw shaft 26 is maintained. Accordingly, the screw shaft 26 and the cap member 27 are combinedly rotated. Note that the screw shaft 26 may be press-fitted into a blind hole, instead of the through hole.

A casing 28 having a hole through which the cap member 27 passes is secured on the mounted base 21. The casing 28 incorporates an angular bearing 29 forming a bearing of the present invention. The casing 28 has an opening to which a lid member 30 is fixedly attached to prevent the angular bearing 29 from falling out of the casing 7.

The angular bearing 29 has an inner ring 29a supported by the cap member 27. The inner ring 29a has an end adjoining the flange 27a and the other end adjoining an end of the coupling member 31. While the inner ring 29a of the angular bearing 29 is pressed between the coupling member 31 and the flange 27a, the coupling member 31 is secured to the cap member 27.

Specifically, the coupling member 31 has a hole 31a extending therethrough in the axis direction, and also has screw holes 31b and 31c extending in the radial direction to connect to the hole 31a.

The leading end of the cap member 27 which supports the inner ring 29a of the angular bearing 29 is inserted into the hole 31a of the coupling member 31. In this insertion, while the end of the coupling member 31 is pressed against the inner ring 29a, a hexagon socket set screw N1 is threaded into the screw hole 31b. Then, the leading end of the hexagon socket set screw N1 presses the cap member 27 to lock the coupling member 31 and the cap member 27 together.

In this manner, the inner ring 29a is fixedly interposed between the cap member 27 and the coupling member 31, thereby inhibiting the cap member 27 and the screw shaft 26 fixed to the cap member 27 from rattling in the axis direction.

The leading end of the cap member 27 faces a rotating shaft 32 of a motor M. The rotating shaft 32 is inserted into the hole 31a of the coupling member 31, and then a hexagon socket set screw N2 is used to lock the coupling member 31 and the rotating shaft 32 together in a similar manner to that as described above. That is, the rotating shaft 32 of the motor M and the cap member 27 (i.e., the screw shaft 26) are coupled through the coupling member 31. As a result, upon rotation of the rotating shaft 32 by driving the motor M, the screw shaft 26 rotates together with the rotating shaft 32, so as to move the slide table 23 along the rail 22.

In the slider unit as described above, the angular bearing 29 is tightly held between the coupling member 31 and the flange 27a provided on the cap member 27. This structure eliminates, for example, the need for parts provided specifically for inhibiting the movement of the screw shaft 26 in the axis direction, such as a collar or a bearing nut used in conventional slider units, and also for a screw groove for securing such parts. In other words, the coupling member 31 which is originally used for coupling the screw shaft 26 (i.e., cap member 27) to the rotating shaft 32 of the motor M has also the function of preventing the backlash of the screw shaft 26, thus making it possible to omit the space for providing the collar and the bearing nut in the conventional art, resulting in a reduction in size of the entire unit.

In the aforementioned embodiment, the cap member 27 is fixed to the leading end of the screw shaft 26 and the angular bearing 29 holds and supports the screw shaft 26 in the cap member 27. However, the cap member 27 is not an essential component. For example, the screw shaft 26 and the cap member 27 can be formed in one piece. In addition, the screw shaft 26 may include a no-screw-groove portion of its lead end close to the motor M for supporting the angular bearing 29.

In this connection, since the cap member 27 is not required to be subject to the quench-hardening process, if the screw shaft 26 and the cap member 27 are independently formed as described above, the costs involved in forming independently them can be lower than the cost involved in forming a holding portion in the screw shaft 26. If the cap member 27 independently formed is fixed to the leading end of the screw shaft 26 closer to the motor M, this makes it unnecessary to machine the leading end of the screw shaft 26. For this reason, the screw shaft 26 can be changed in length as appropriate for use by being cut to a length corresponding to the stroke. In turn, this makes the common use of the screw shaft 26 possible, resulting in a reduction in inventories.

In addition, since the cap member 27 is softer than the screw shaft 26, the leading end of the hexagon socket set screw N1 is easily engaged in the cap member 27. The effective prevention of the loosening of the hexagon socket set screw N1 can be expected.

What is claimed is:

1. A small slider unit, comprising:

a rail;

a slide table movable on the rail;

a screw shaft coupled to the slide table and situated parallel to the rail;

a motor for rotating the screw shaft;

a coupling member for providing the coupling between a rotating shaft of the motor and the screw shaft; and a bearing supporting the screw shaft, arranged so that when the screw shaft is rotated by the motor, the screw shaft moves the slide table, wherein a leading end of the screw shaft closer to the motor is fixedly press-fitted into a cap member supported by an inner ring of the bearing, wherein the cap member has a hole, and the leading end of the screw shaft is fixedly press-fitted into the hole, wherein the cap member has one end that serves as an insertion opening into which the screw shaft is inserted and at which a flange is formed and placed into contact with one end of the inner ring of the bearing, wherein the other end of the cap member is inserted into the coupling member and pressed and secured to the coupling member by a screw, wherein the rotating shaft of the motor is inserted through one end of the coupling member located farther from the cap member into the coupling member and is pressed and secured to the coupling member by a screw, and wherein the other end of the coupling member comes into contact with the other end of the inner ring of the bearing, wherein the other end of the coupling member and the flange of the cap member are pressed directly against the bearing, so that the bearing is held between the other end of the coupling member and the flange.

* * * * *